(12) United States Patent
Nakagawa

(10) Patent No.: US 6,561,483 B2
(45) Date of Patent: May 13, 2003

(54) GATE VALVE

(75) Inventor: Masaharu Nakagawa, Tokyo (JP)

(73) Assignee: Irie Koken Co., Ltd., Tokyo (JP)

( * ) Notice: Subject to any disclaimer, the term of this patent is extended or adjusted under 35 U.S.C. 154(b) by 0 days.

(21) Appl. No.: 09/876,947

(22) Filed: Jun. 11, 2001

(65) Prior Publication Data

US 2002/0066877 A1 Jun. 6, 2002

(30) Foreign Application Priority Data

Dec. 4, 2000 (JP) .................................... 2000-368435

(51) Int. Cl.$^7$ ................................................ F16K 25/02
(52) U.S. Cl. .................... 251/175; 251/196; 251/335.3
(58) Field of Search .................. 251/193, 195, 251/196, 326, 327, 328, 329, 175, 335.3

(56) References Cited

U.S. PATENT DOCUMENTS

| | | | | |
|---|---|---|---|---|
| 3,241,807 A | * | 3/1966 | Holderer | 251/175 |
| 3,343,562 A | * | 9/1967 | Combes | 251/175 |
| 3,524,467 A | * | 8/1970 | Worley | 251/175 |
| 4,157,169 A | * | 6/1979 | Norman | 251/195 |
| 4,381,100 A | * | 4/1983 | Schoenberg | 251/175 |
| 6,302,372 B1 | * | 10/2001 | Sauer et al. | 251/195 |
| 6,427,973 B1 | * | 8/2002 | Wagner | 251/175 |

* cited by examiner

Primary Examiner—David A. Scherbel
Assistant Examiner—John Bastianelli
(74) Attorney, Agent, or Firm—Sughrue Mion, PLLC

(57) ABSTRACT

A gate valve according to the present invention including a first valve plate having a valve opening and a second valve plate connected to the first valve plate via a first bellows, in which the rigidity and the like of the valve plates, a valve rod, and the like can be reduced as compared to that in a conventional art by canceling the differential pressure.

15 Claims, 15 Drawing Sheets

FIG. 3
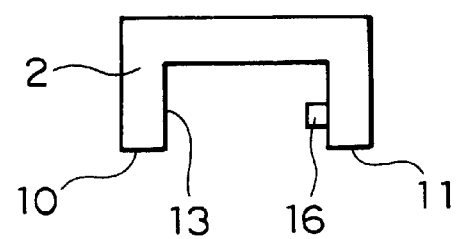
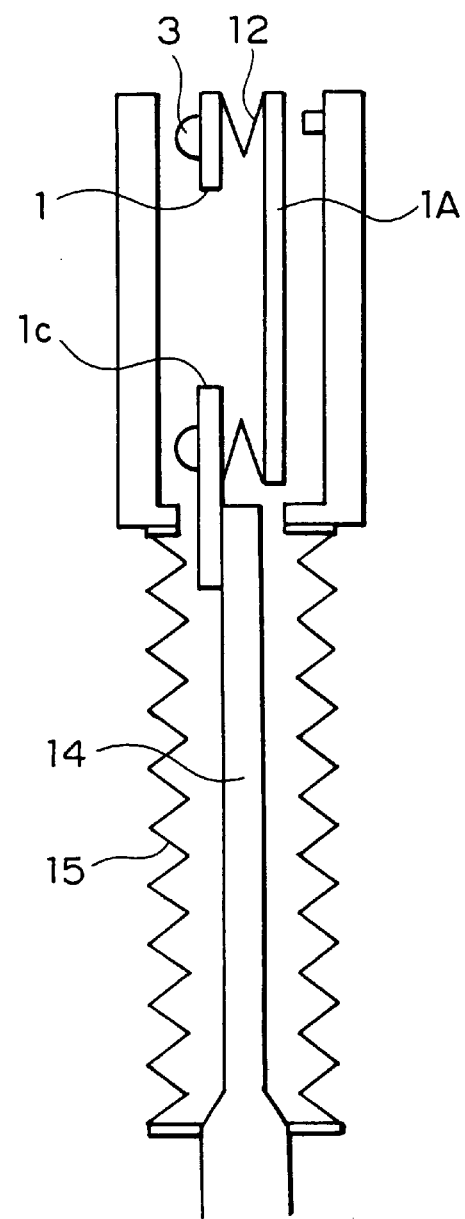

GATE VALVE

BACKGROUND OF THE INVENTION

1. Field of the Invention

The present invention relates to a gate valve and, more particularly, to improvements in which a pair of valve plates connected to each other with bellows are used to open and close a valve of a valve casing and the like, thereby reducing the differential-pressure generating force applied to a driving valve plate by valve-operation driving force, and allowing the valve plates and a valve-plate driving section to be lightweight and to have low rigidity.

2. Description of the Related Art

Conventionally, structures of non-sliding vacuum gate valves disclosed in, for example, Japanese Unexamined Patent Application Publication Nos. 8-42715 and 10-110834, which are not shown, are generally adopted.

In this constructed conventional non-sliding vacuum gate valves, the following problems occur:

Since a simple valve plate having no bellows is vertically moved to open and close a valve of an opening of a valve casing, if the relationship between the pressure $P_0$ on the side of a valve plate 1 and the pressure $P_1$ on the side of a valve casing 2 satisfies the condition $P_1 > P_0$, the pressure $P_1$ is applied to an area Sa surrounded by a sealing member 3 so that the valve plate 1 separates from a valve seat 4 as in FIG. 1.

A force f, where $f = (P_1 - P_0) \cdot Sa$, is applied and it becomes necessary to add the value f to the seating force which is originally required in order to achieve the operating force required for the valve closing (sealing) operation. Therefore, the valve plate and the valve-plate driving section are required to have a large weight and high rigidity, and consequently, the structure of the gate valve itself becomes so large and complicated that it is difficult to manufacture at a low cost.

SUMMARY OF THE INVENTION

The present invention has been made to solve the above problems. Accordingly, it is an object of the present invention to provide a gate valve in which a pair of valve plates connected to each other with bellows are used to open and close a valve of a valve casing and the like, thereby reducing the differential pressure serving as resistance against a valve-operation driving force and allowing the valve plates and a valve-plate driving section to be lightweight and to have low rigidity.

A gate valve according to the present invention comprises: a first valve plate having a valve opening; and a second valve plate connected to the first valve plate via a first bellows. Preferably, the first valve plate has a valve rod connected thereto, a plurality of the first bellows are arranged in parallel, the first valve plate has valve openings, each corresponding to one of the first bellows, and the first valve plate has a first sealing member at a surface thereof. The gate valve according to the present invention further comprises: a valve casing for enclosing the valve plates in a manner so as to be moved; a first valve seat formed at a first opening of the valve casing and with which the first sealing member comes into contact; and a first stopper formed at a second opening of the valve casing and with which the second valve plate comes into contact. Preferably, the valve casing has a second stopper provided on the inside thereof, the second stopper being located between the first and second valve plates and coming into contact with the inner face of the second valve plate. A gate valve according to the present invention further comprises: a valve casing for enclosing the valve plates in a manner so as to be moved; a first sealing member formed at a first opening of the valve casing; and a first stopper formed at a second opening of the valve casing, with which the second valve plate comes into contact. Preferably, the first valve plate has a second stopper provided on the inside of the first bellows, the second stopper coming into contact with the second valve plate, and the second valve plate has a second stopper extending to the side of the first valve plate, which is provided on the inside of the first bellows. Preferably, the second valve plate has the second stopper extending to the side of the first valve plate and located on the outside of the first bellows. Preferably, a pressure-receiving area of the seat section of the first valve plate is smaller than a pressure-receiving area of the first bellows, which is based on the opening of the first bellows. The shape of the valve opening formed at the first valve plate may be one of a circle, a rectangle, a triangle, and an ellipse.

BRIEF DESCRIPTION OF THE DRAWINGS

FIG. 3 is a cross sectional view showing a state in which the valve in FIG. 2 is opened;

DESCRIPTION OF THE PREFERRED EMBODIMENTS

Figure 1:
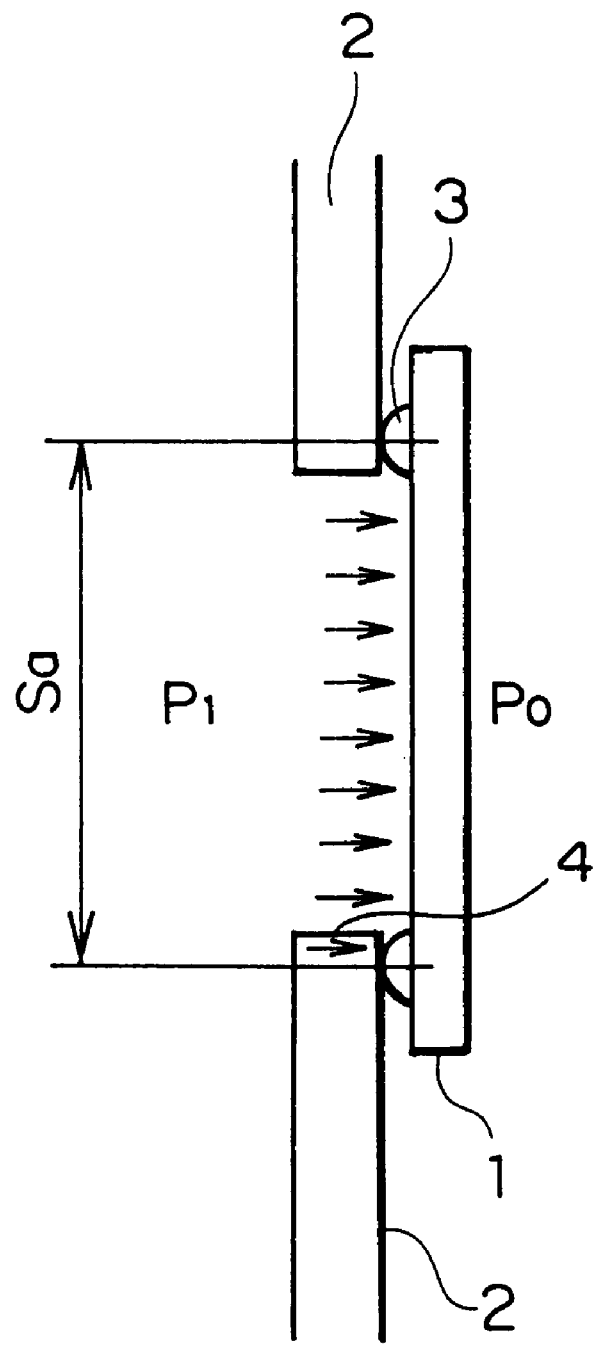
FIG. 1 is a structural view showing the operation of a conventional gate valve.

Preferred embodiments of a gate valve according to the present invention will be described hereinbelow with reference to the drawings.

Parts which are similar to or correspond to parts in the conventional art are given like reference numerals throughout.

Figure 2:
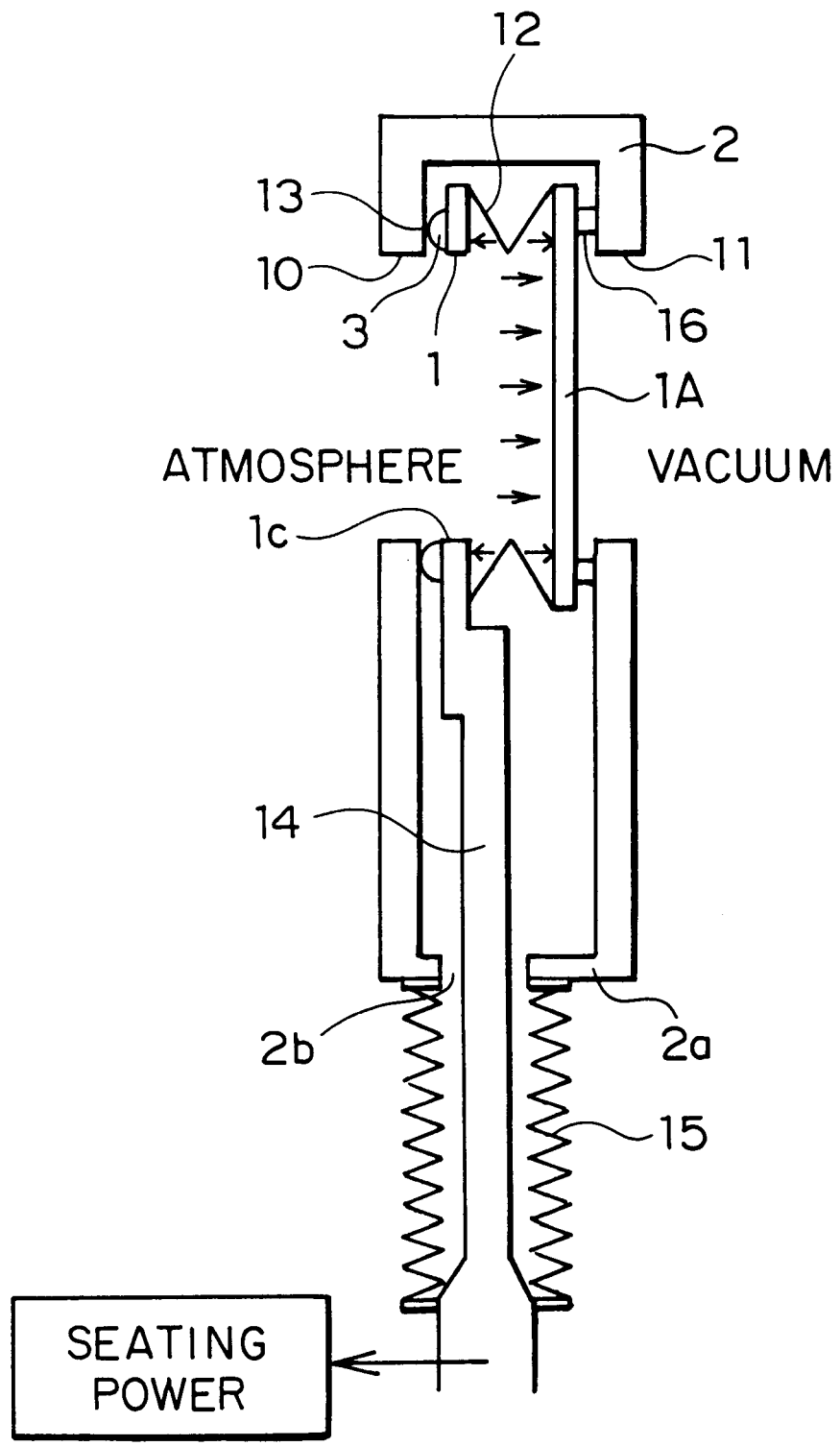
FIG. 2 is a cross sectional view of a gate valve according to the present invention.
Figure 4:
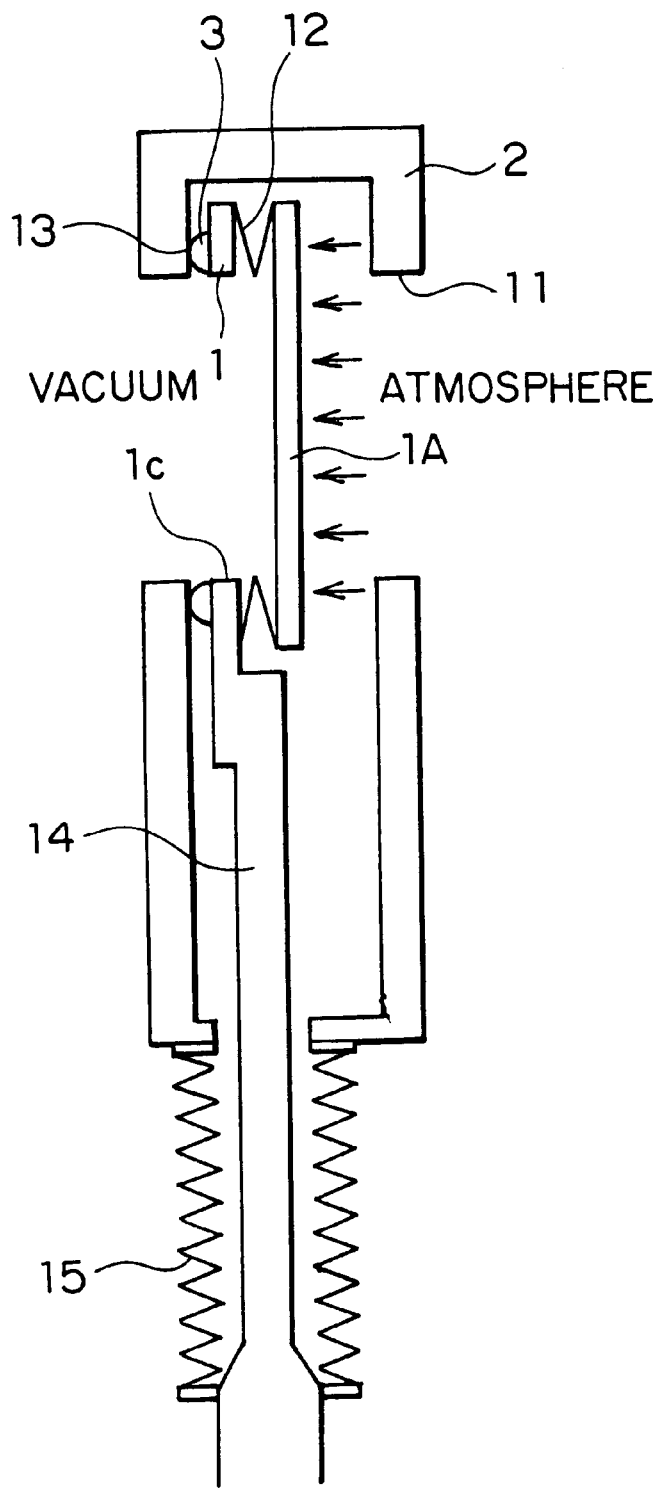
FIG. 4 is a cross sectional view showing a state opposite to the pressure state in FIG. 2.

In FIG. 2, reference numeral 2 denotes a valve casing having a first opening 10 and second opening 11, in which a first valve plate 1 and second valve plate 1A are separate but connected to each other via first bellows 12.

A first sealing member 3 comes into contact with a first valve seat 13 of the first opening 10, and a valve rod 14 is disposed in a guide hole 2b of a lower part 2a of the valve casing 2 such that it can be vertically moved via a second bellows 15.

The second valve plate 1A is constructed such that it comes into contact with a first stopper 16 provided on the inside of the second opening 11 of the valve casing 2.

When the valve plates seal two spaces in which differential pressure exists, there is positive-pressure sealing, wherein the differential pressure works in the direction of a seat of the valve plate, and counterpressure sealing, wherein the differential pressure works in the direction of separating the valve plate from the valve seat.

In the case of counterpressure sealing of the gate valve in FIG. 2, the pressure on the side of the seat (chamber) is introduced through a valve opening 1c of the first valve plate 1, and a pressure difference between the interior of the valve plate and the exterior of the valve plate is applied to the second valve plate 1A by an amount of corresponding to an effective pressure-receiving area of the bellows, and consequently, the distance between the first valve plate 1 is increased by a specified amount so that the second valve plate 1A comes into contact with the first stopper 16 of the valve casing 2. That is, the force of the differential pressure which is originally to be applied to the first valve plate 1, and which is applied to the effective pressure-receiving area of the bellows, is cancelled by the first valve plate 1 and is transferred to the second valve plate 1A, and is then received by the first stopper 16.

In addition, a similar result can be obtained not only when the first sealing member 3 is mounted on the first valve plate 1 as in FIG. 2, but also when the first sealing member 3 is mounted on the side of the first valve seat 13 of the valve casing 2, as in FIGS. 10 to 13.

Also, by changing the effective pressure-receiving area of the first bellows 12, the ratio of the pressure which cancels the differential pressure applied to the first valve plate 1 can also be changed.

In this instance, when the differential pressure is generated on the inside and the outside of the bellows, a force is generated in the direction of the expansion of the bellows, wherein the effective pressure-receiving area is an area in which a multiplied value with said differential pressure equals the force generated in the direction of expansion.

Accordingly, as shown in FIG. 2, the force generated at the second valve plate 1A on the non-seat side is received by the first stopper 16 such that the differential pressure, which increases in proportion to the opening area, is cancelled, thereby lightweight and low-rigidity of the valve plate and valve driving section, which required high rigidity in the conventional art, can be realized.

Subsequently, the principle of canceling the differential pressure in the above structure will be specifically described hereinbelow.

Figure 16:
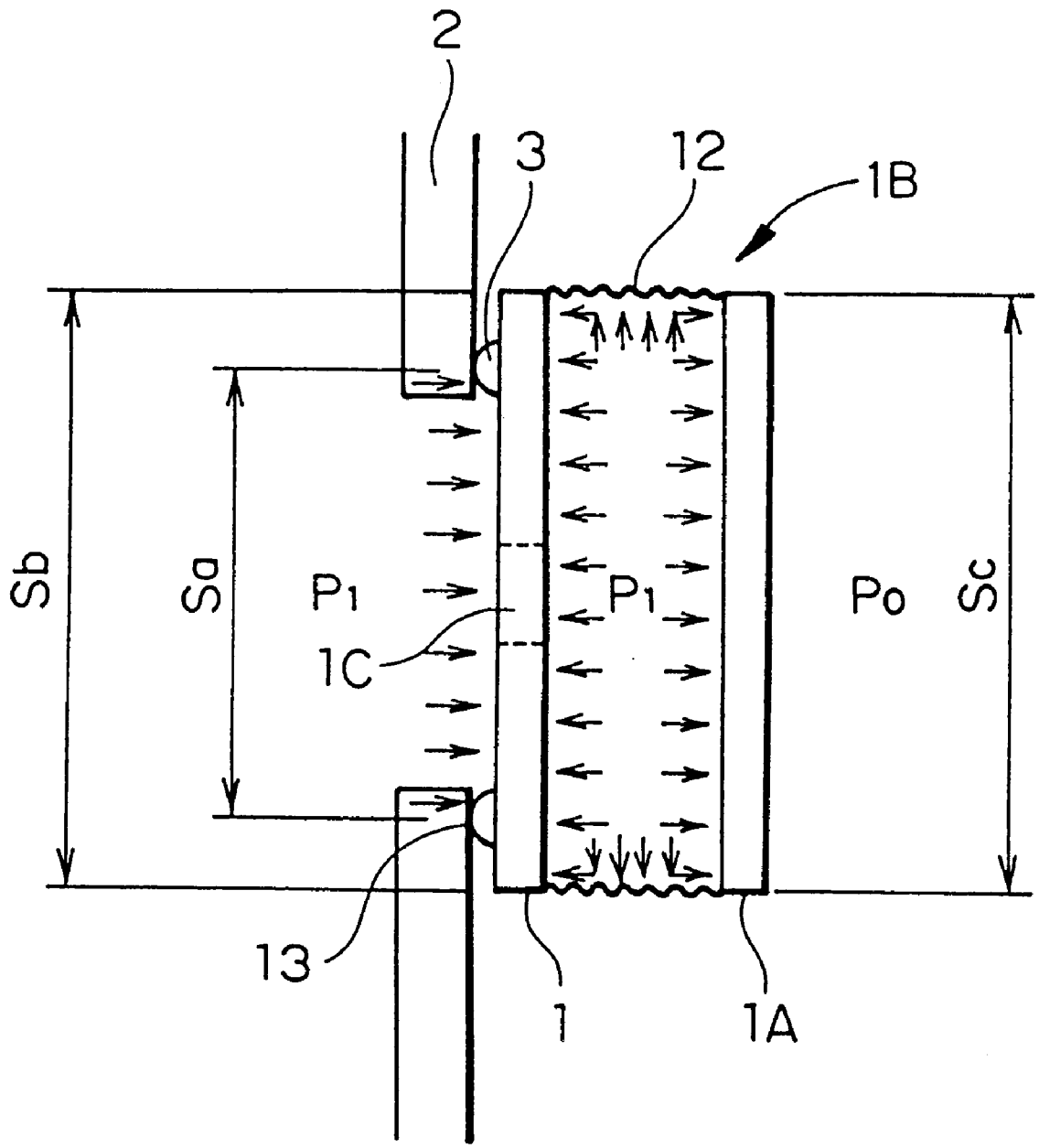
FIG. 16 is a structural view showing the operation of the gate valve in FIG. 2.

Valve closing operation of the differential pressure canceling structure will be described with reference to FIG. 16.

The first valve plate 1 has the valve opening 1c (the section indicated by dotted line). However, in FIG. 16, the valve opening 1c is closed and the pressure in a valve unit 1B is set to $P_1$ for the purpose of simplifying the description of the calculation of the differential pressure applied to the first valve plate 1, while the first valve plate 1 is under the same conditions as in the case of having the valve opening 1c.

$$P_1 > P_0$$

Sa: Area surrounded by the first sealing member 3

Sb: Effective pressure-receiving area to which the pressure $P_1$ is applied in the valve unit 1B in the direction in which the first valve plate 1 is brought to the seat and the dimension is determined depending on the first bellows 12.

Sc: Effective pressure-receiving area to which the pressure $P_1$ is applied in the valve unit 1B in the direction in which the second valve plate 1A is separated from the seat face and the dimension is determined depending on the first bellows 12.

In the first valve plate 1, the pressure $P_1$ is applied to the pressure-receiving area Sa in the direction in which the first valve plate 1 is separated from the first valve seat 13, and at the same time, the pressure $P_1$ is applied to the pressure-receiving area Sb surrounded by the first bellows 12 in the valve unit 1B in the direction of sealing.

Here, if the differential pressure that is applied to the first valve plate 1 by the pressure $P_1$ (in the direction separating from the valve seat) is f, $$f = (P_1 - P_0) \cdot (Sa - Sb)$$

When f>0, f is applied in the direction in which the first valve plate 1 and the first valve seat 13 are separated from each other.

When f<0, f is applied in the direction in which the first valve plate 1 and the first valve seat 13 are brought into pressure contact with each other. Accordingly, the differential pressure applied to the pressure-receiving area Sa of the first valve plate 1 can be reduced (cancelled) by pressure corresponding to the pressure-receiving area Sb. While Sa, which is generally required in product specifications, is usually a fixed value, the value Sb is varied so that the amount of pressure which cancels the differential pressure can freely be set.

On the other hand, assuming that the first bellows 12 is not deformed (swollen) to a right angle relative to the expanding direction, (as shown in the case where the inner part constructed by an expanding member has a uniform and parallel cylindrical shape), the following equation:

$$Sb = Sc$$

is obtained. The pressure $P_1$ in the valve unit 1B is applied to the pressure-receiving area Sc of the second valve plate 1A so as to separate the second valve plate 1A from the seat. The second valve plate 1A, which receives the pressure, is separated from the first valve plate 1 and is moved a specified distance due to the expansion of the first bellows 12. However, the second valve plate 1A is brought into contact with a stopper (not shown) to absorb the differential pressure.

In this case, although a reactive force associated with the expansion is generally generated in the first bellows 12, the strength is so small compared with f that it is ignored.

FIG. 3 shows a state in which the valve rod 14 is moved downward from the closed state of the valve in FIG. 2 and the openings 10 and 11 of the valve casing 2 are opened so as to open the valve.

Figure 5:
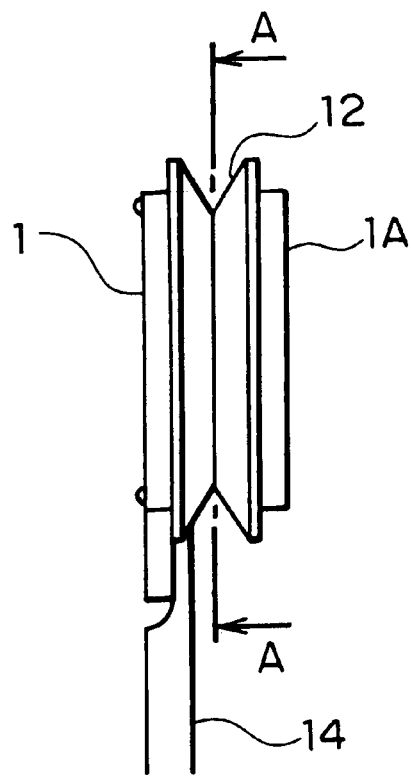
FIG. 5 is a structural view of another embodiment of the present invention in FIG. 2.
Figure 6:
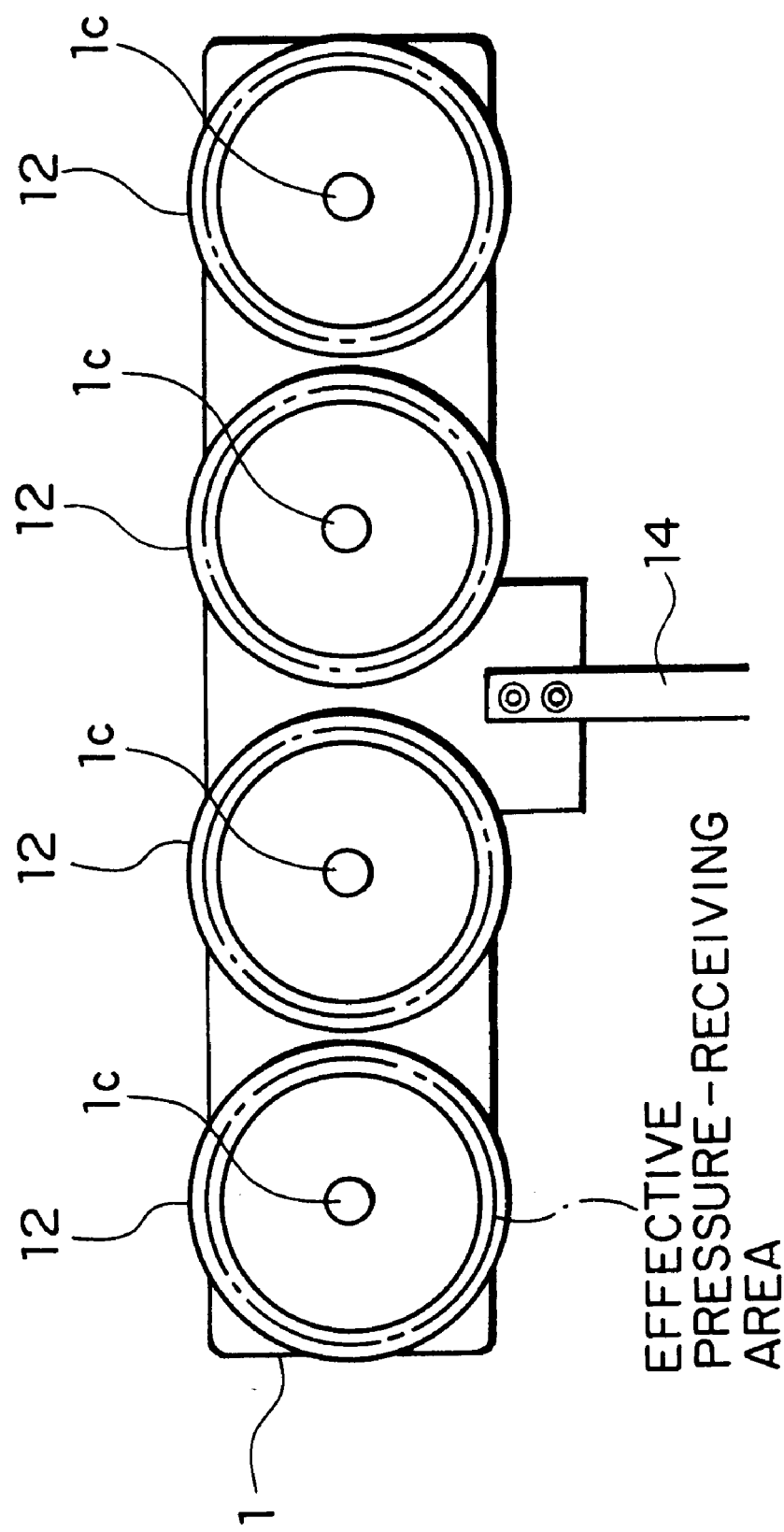
FIG. 6 is a cross sectional view of a first valve plate in FIG. 5.

FIGS. 5 and 6 show another embodiment, in which the plurality of first bellows 12 are horizontally arranged in parallel between the valve plates 1 and 1A, and in which, when the first valve plate 1 has the valve openings $1_c$, each corresponding to one of the first bellows 12, a result similar to that shown in FIG. 2 can be obtained.

Figure 7:
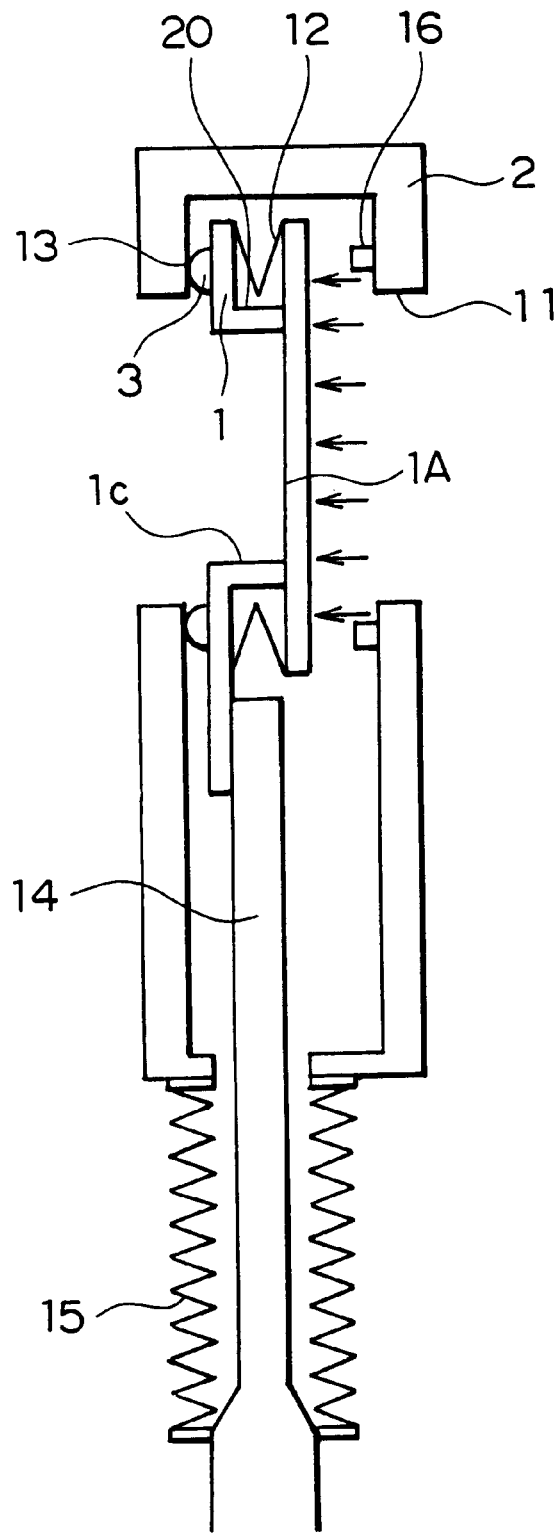
FIG. 7 is a cross sectional view of another embodiment of the present invention in FIG. 2.

FIG. 7 shows another embodiment of the invention in FIG. 2. In the structure in FIG. 2, when the distance between the two valve plates 1 and 1A is decreased due to the pressure difference applied to the both sides of the sealing face when closing the valve, a second stopper 20 for stopping the reduction displacement of the second valve plate 1A at a specified value is provided in a manner such that it is integrated with the first valve plate 1 and is protruded from the inside of the first bellows 12 toward the second valve plate 1A. In addition, the second stopper 20 can also be mounted not only on the first valve plate 1, but on the second valve plate 1A.

Figure 8:
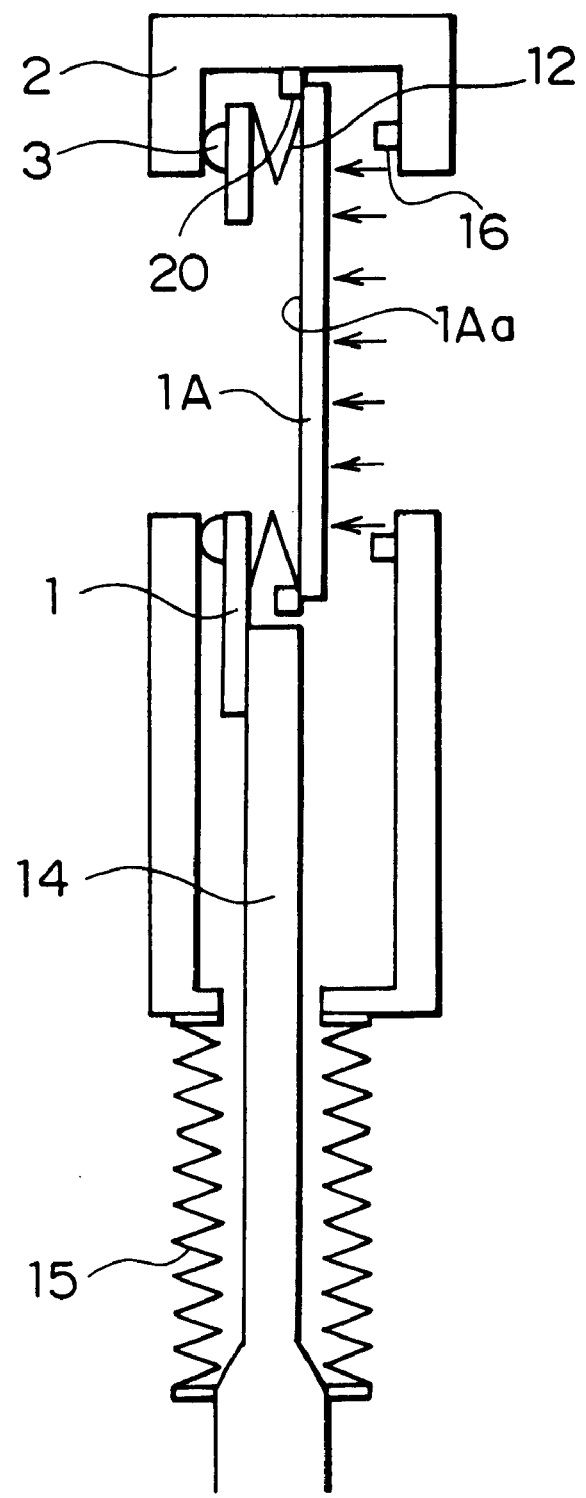
FIG. 8 is a cross sectional view of another embodiment of the present invention in FIG. 2.

In another embodiment described in FIG. 8, the second stopper 20 is placed in the valve casing 2 and also between the first and second valve plates 1 and 1A, on the outside of the first bellows 12, and in any case, the second stopper 20 is brought into contact with an inner face 1Aa of the second valve plate 1A.

Accordingly, when normal sealing, an excessive compressive deformation generated at the first bellows 12 between the valve plates 1 and 1A due to the differential pressure that is applied thereto can be prevented, and the differential pressure applied to the valve plates 1 and 1A when normal sealing can be cancelled, thereby preventing excessive force from being applied to the first sealing member 3 and the valve plates 1 and 1A. Thus, when the valve shifts from a closed state to an opened state, excessive valve-opening force against the differential pressure is not required.

Figure 9:
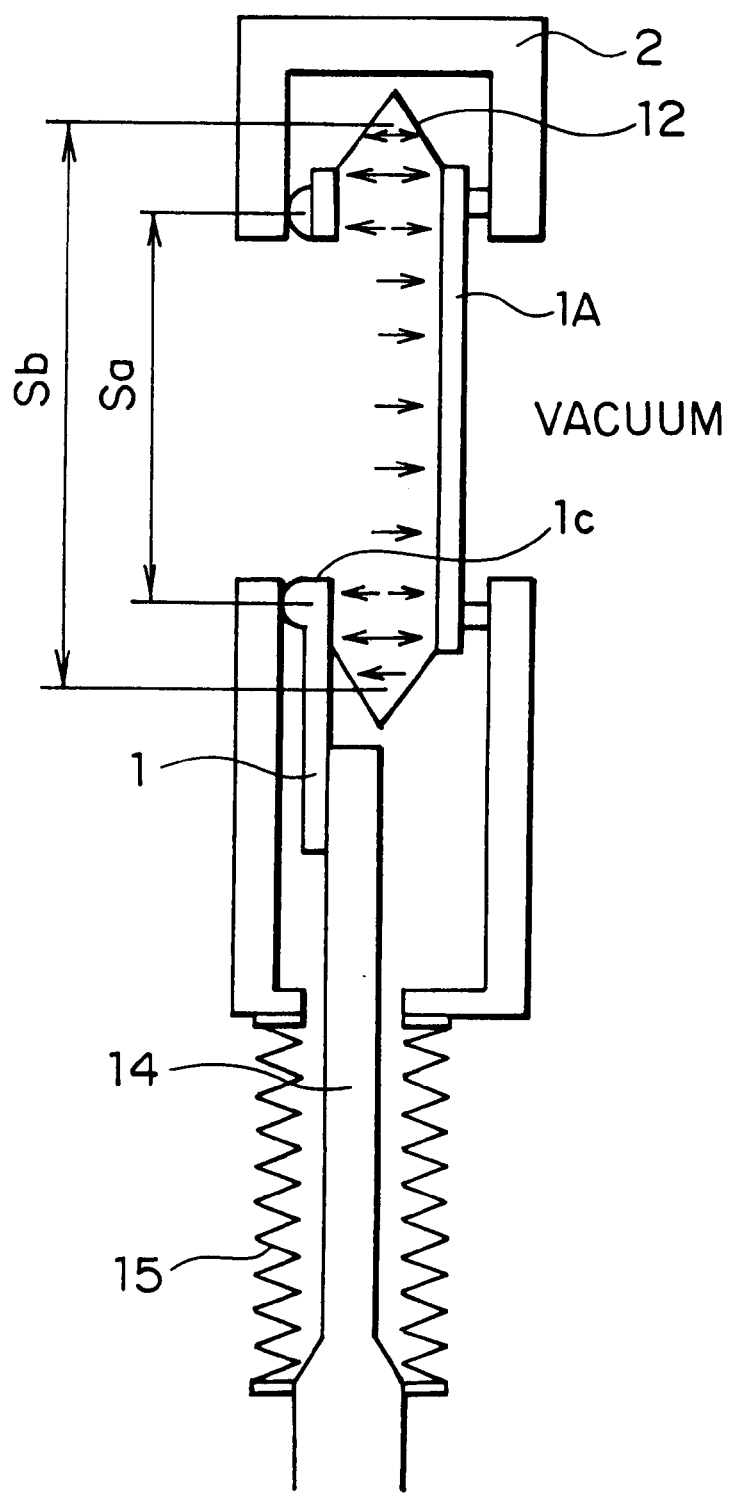
FIG. 9 is a cross sectional view showing canceling of the differential pressure in FIG. 2.
Figure 10:
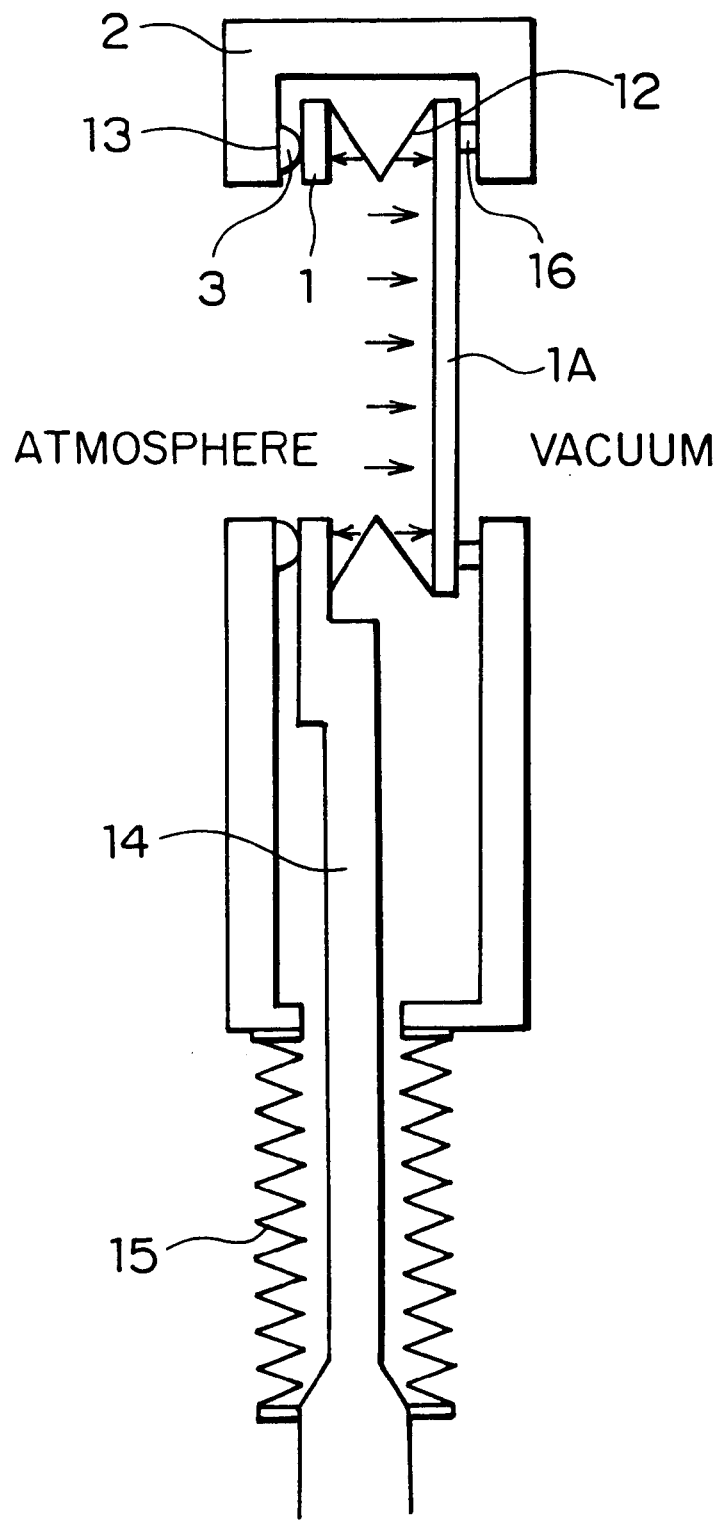
FIG. 10 is a cross sectional view of another embodiment of the present invention in FIG. 2.
Figure 11:
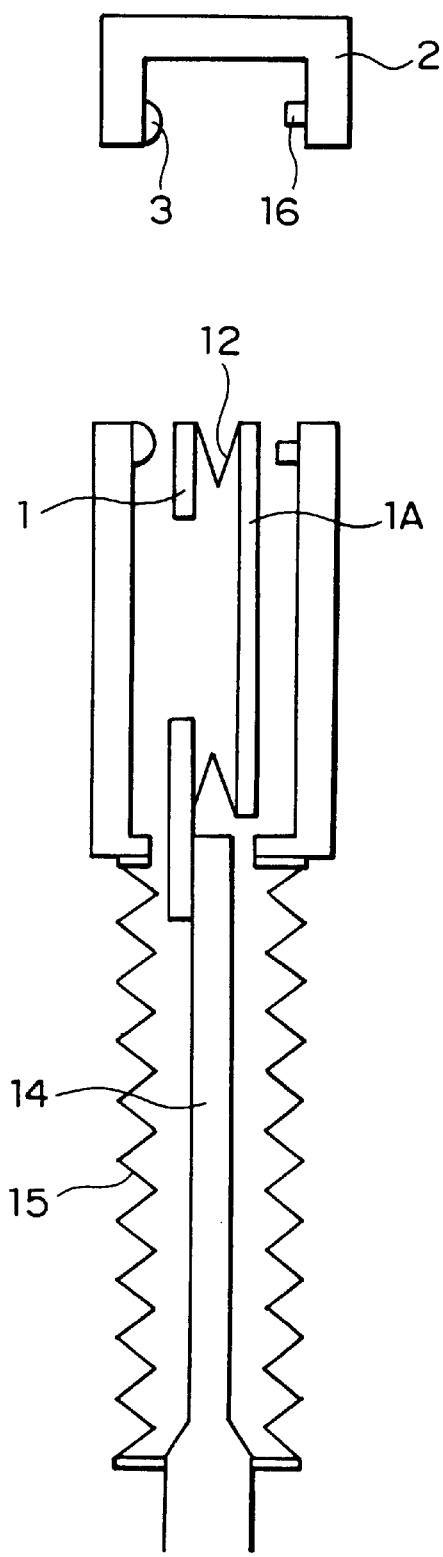
FIG. 11 is a cross sectional view of another embodiment of the present invention in FIG. 3.
Figure 12:
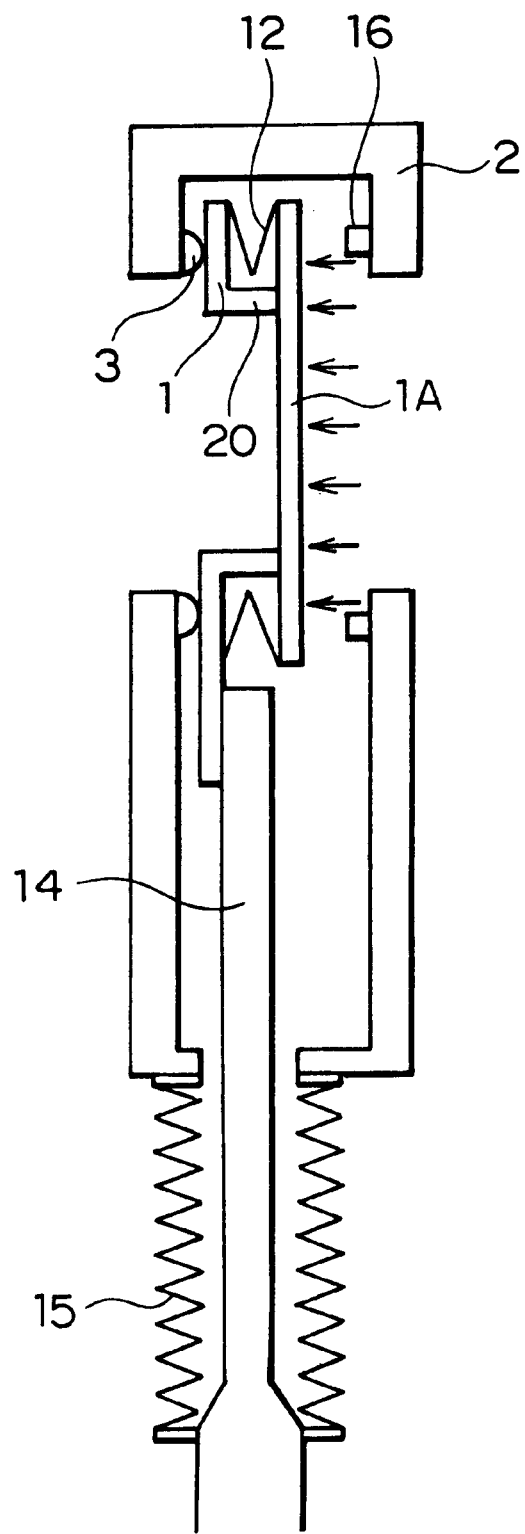
FIG. 12 is a cross sectional view of another embodiment of the present invention in FIG. 7.
Figure 13:
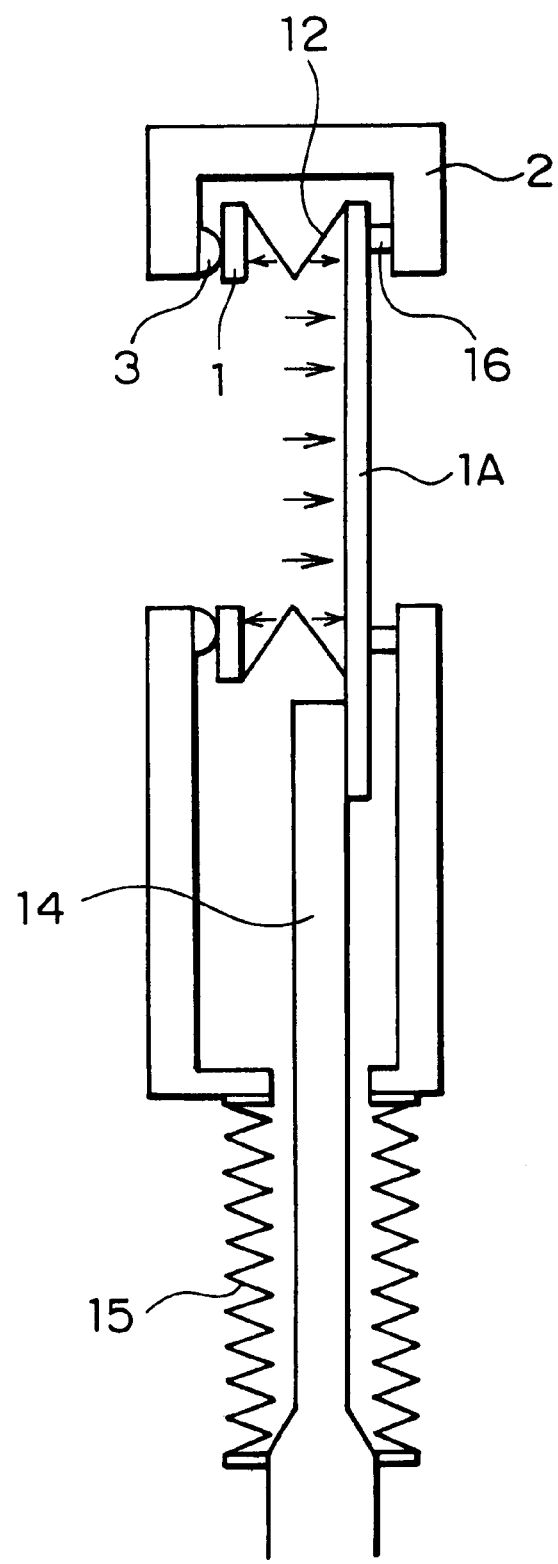
FIG. 13 is a cross sectional view of another embodiment of the present invention in FIG. 2.

FIG. 9 shows a case of counter pressure sealing. In this case, when a slight sealing force is applied to the valve plate 1 at the start of sealing, the differential pressure is applied to the first bellows 12 in the direction of sealing to become a self-sealing state.

Accordingly, by merely applying a slight force to the valve plates 1 and 1A at the start of sealing, the sealing operation can be maintained after the differential pressure is generated, even if the driving force to the valve plates 1 and 1A for sealing operation is cancelled.

Thus, the valve plates 1 and 1A can be driven for sealing by a remarkably small force, and the function of self-sealing of a valve can be secured after the differential pressure is generated. Accordingly, the self-sealing force can be obtained by the following equation:

Self-sealing force=Differential pressure×(Effective pressure-receiving area $Sb$ of first bellows 12–Pressure-receiving area $Sa$ of seat section)

In other embodiments in FIGS. 10 to 13, even when the first sealing member 3 is mounted, not on the side of the first valve plate 1 in the embodiments in FIGS. 2, 3, 4, and 7, but at a position corresponding to the first valve seat 13 formed on the inside of the first opening 10 of the valve casing 2, a result similar to that, shown in FIGS. 2, 3, 5, and 7 can be obtained. In the structure in FIG. 12, particularly, although the second stopper 20 is integrated with the first valve plate 1, the same result may also be obtained in the case where the second stopper 20 is mounted on the second valve plate 1A.

Figure 14:
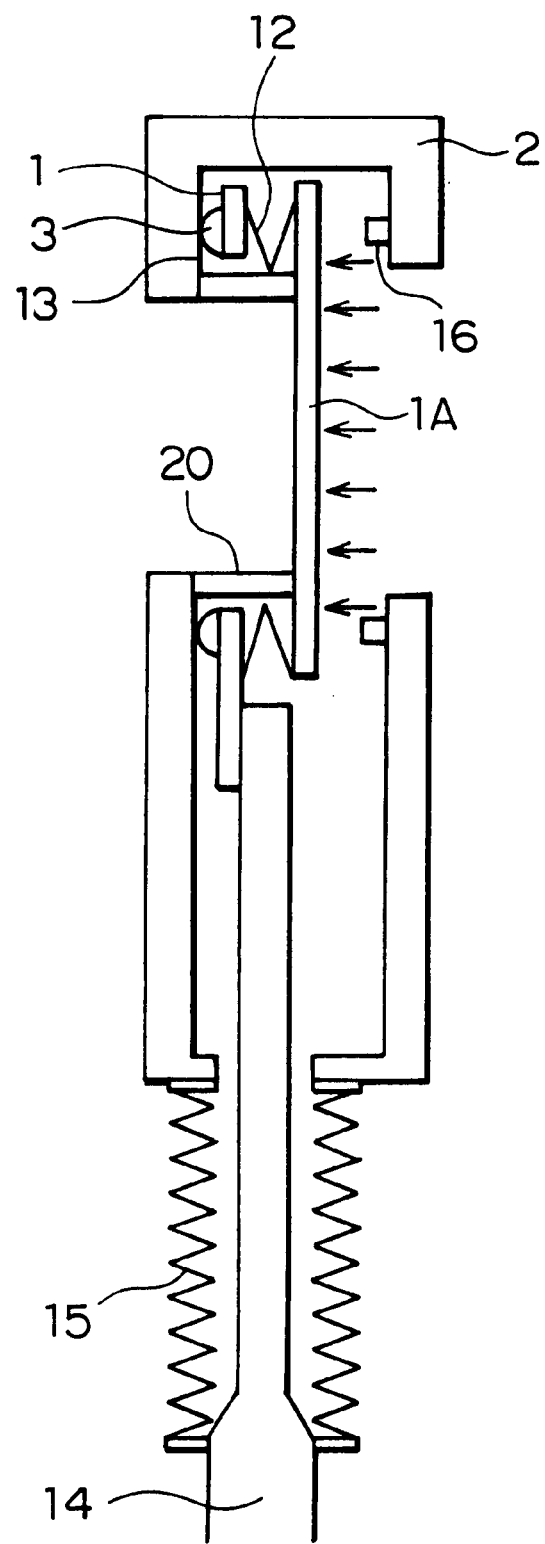
FIG. 14 is a cross sectional view of another embodiment of the present invention in FIG. 2.
Figure 15:
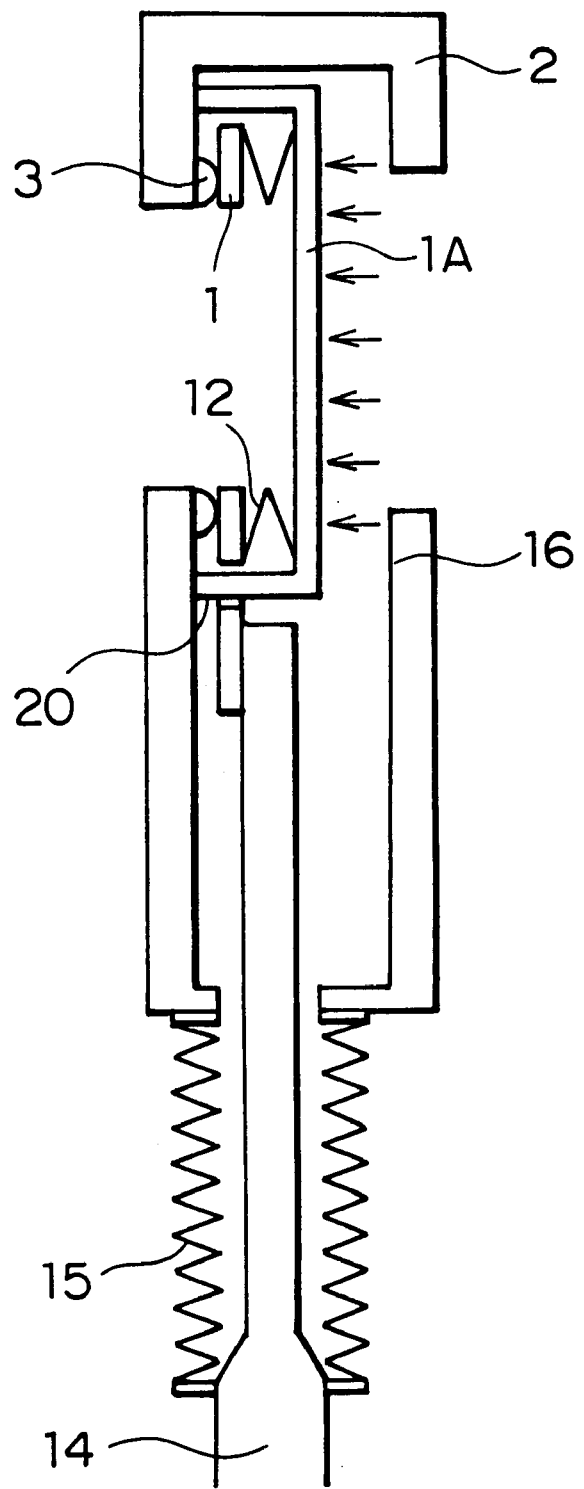
FIG. 15 is a cross sectional view of another embodiment of the present invention in FIG. 14.

FIGS. 14 and 15 show other embodiments of the structure in FIG. 2. In FIG. 14, the second stopper 20 protrudes from the second valve plate 1A to the side of the first valve plate 1 and is also located at the inside of the first bellows 12.

In FIG. 15, the second stopper 20 protrudes from the second valve plate 1A to the side of the first valve plate 1 and is also located at the outside of the first bellows 12. Thus, in the structure in FIG. 2, since the differential pressure applied to the second valve plate 1A pushes the first valve plate 1 toward the seat, when a high pressure is applied to a chamber on the left side, a large force is required to cancel the sealing by the first sealing member 3. In the structures in FIGS. 14 and 15, however, since the second stopper 20 extends to almost the same position as an outer end of the first valve plate 1, an end of the second stopper 20 comes into contact with the first valve seat 13 of the valve casing 2, thereby preventing further pressure, and accordingly, canceling the sealing with a force smaller than that when the first valve plate 1 is strongly pushed in the structures in FIGS. 4 and 7.

Since the gate valve according to the present invention is constructed as described above, the following advantages can be provided:

Since one valve plate has an opening and is connected to another valve plate with the bellows so that the differential pressure can be cancelled, the valve plate and the valve plate driving section, which are conventionally required to be rigid, can have low weight and low rigidity. In addition, since a driving force is also required for a valve closing operation at the seat position can be remarkably reduced, the driving mechanism can be simplified, processing accuracy required for the members can be reduced, and the slack (safety factor) of the sealing operation can be increased. Consequently, the manufacturing cost of the entire apparatus can be decreased and the reliability of the operating function can remarkably be improved.

Also, since the stopper is provided not only on the second valve plate side, but also between the first and second valve plates, an excessive compressive deformation of the bellows between the two valve plates due to the differential pressure applied to the valve plates upon normal sealing can be prevented.

In addition, since the effective pressure-receiving area of the bellows is made larger than the opening sealing area, in the case of counterpressure sealing, the valve plates can be provided with a self-sealing structure in which the differential pressure is applied in the sealing direction by applying a slight sealing force to the valve plates at the start of sealing. Accordingly, by merely applying a slight force to the valve plates at the start of sealing, the sealing operation can be maintained after the differential pressure is generated, even if the driving force to the valve plates for sealing operation is cancelled. Consequently, the valve plates can be driven for sealing by a remarkably small force, and after the differential pressure is generated, the function of self-sealing of a valve plate can be secured.

In addition, even if a large differential pressure is applied to the valve plate by the stopper provided at the second valve plate so as to extend to the side of the first valve plate to seal to seal the valve plate with a large pressure, the valve plate sealing position is limited by the stopper, thereby canceling sealing without a large force.

What is claimed is:

1. A gate valve comprising:
   a first valve plate having a valve opening; and
   a second valve plate connected to the first valve plate via a first bellows,
   wherein the valve opening is positioned so as to introduce a pressure which acts on said second valve plate; and
   wherein said second valve plate is movable in a direction away from and toward said first valve plate.

2. A gate valve according to claim 1, wherein the first valve plate has a valve rod connected thereto.

3. A gate valve according to claim 1, wherein a plurality of said first bellows are arranged in parallel, and the first valve plate has valve openings, each corresponding to one of the first bellows.

4. A gate valve according to claim 1, wherein the first valve plate has a first sealing member at a surface thereof.

5. A gate valve according to claim 4, further comprising:
   a valve casing for enclosing the first valve plate and the second valve plate in such a manner that the valve plates are movable;
   a first valve seat formed at a first opening of the valve casing and with which the first sealing member comes into contact; and
   a first stopper formed at a second opening of the valve casing and with which the second valve plate comes into contact.

6. A gate valve according to claim 5, wherein the valve casing has a second stopper provided at the inside thereof, said second stopper being located between the first valve plate and second valve plate and coming into contact with the inner face of the second valve plate.

7. A gate valve according to claim 1, further comprising:
   a valve casing for enclosing the first valve plate and the second valve plate in a manner so as to be moved;
   a first sealing member formed at a first opening of the valve casing; and
   a first stopper formed at a second opening of the valve casing and with which the second valve plate comes into contact.

8. A gate valve according to claim 1, wherein the first valve plate has a second stopper provided at the inside of the first bellows, said second stopper coming into contact with the second valve plate.

9. A gate valve according to claim 1, wherein the second valve plate has a second stopper extending to the side of the first valve plate and located on the inside of the first bellows.

10. A gate valve according to claim 1, wherein the second valve plate has a second stopper extending to the side of the first valve plate and located on the outside of the first bellows.

11. A gate valve according to claim 1, wherein a pressure-receiving area of the seat section of the first valve plate is smaller than a pressure-receiving area of the first bellows, which is based on the opening of the first bellows.

12. A gate valve according to claim 1, wherein the shape of the valve opening formed at the first valve plate is one of a circle, a rectangle, a triangle, and an ellipse.

13. A gate valve comprising:
    a first valve plate having a valve opening;
    a second valve plate connected to the first valve plate via a first bellows;
    a valve casing for enclosing the first valve plate and the second valve plate in such a manner that the valve plates are movable;
    a first valve seat formed at a first opening of the valve casing and with which the first sealing member comes into contact; and
    a first stopper formed at a second opening of the valve casing and with which the second valve plate comes into contact.

14. A gate valve according to claim 13, wherein the valve casing has a second stopper provided at the inside thereof, said second stopper being located between the first valve plate and second valve plate and coming into contact with the inner face of the second valve plate.

15. A gate valve comprising:
    a first valve plate having a valve opening;
    a second valve plate connected to the first valve plate via a first bellows;
    a valve casing for enclosing the first valve plate and the second valve plate in a manner so as to be moved;
    a first sealing member formed at a first opening of the valve casing; and
    a first stopper formed at a second opening of the valve casing and with which the second valve plate comes into contact.

* * * * *